(No Model.)
P. ARGALL.
CYANID AND CHLORINATION PROCESS OF TREATING GOLD AND SILVER BEARING ORES.
No. 527,473.    Patented Oct. 16, 1894.
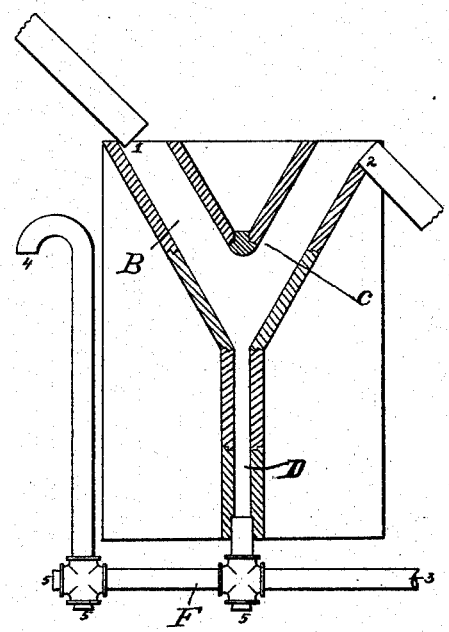
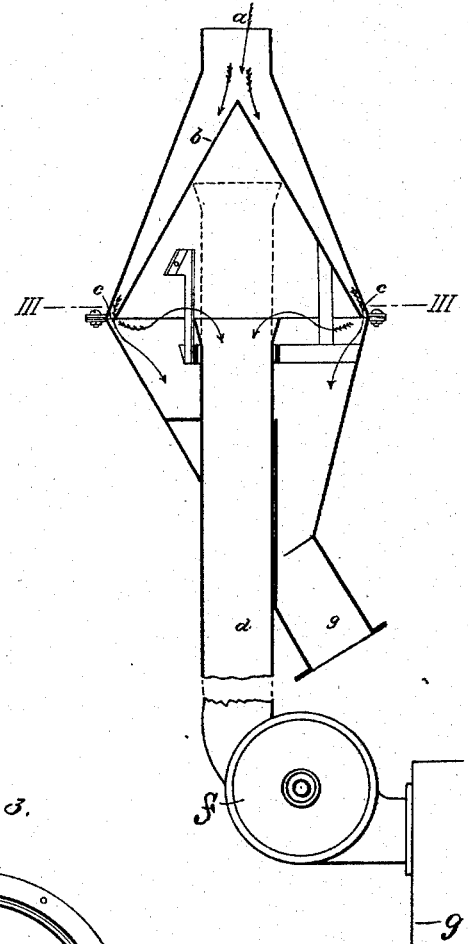
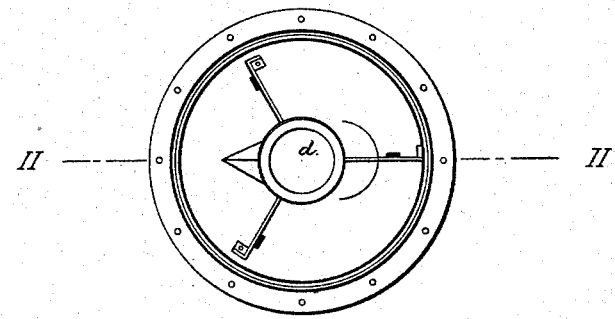
Witnesses.
W. R. Edelen.
Samuel H. Fisher.
Inventor.
Philip Argall
by Pollok & Mauro
his attorneys

UNITED STATES PATENT OFFICE.

PHILIP ARGALL, OF DENVER, COLORADO.

CYANID AND CHLORINATION PROCESS FOR TREATING GOLD OR SILVER BEARING ORES.

SPECIFICATION forming part of Letters Patent No. 527,473, dated October 16, 1894.

Application filed March 15, 1894. Serial No. 503,691. (No specimens.)

*To all whom it may concern:*

Be it known that I, PHILIP ARGALL, of Denver, Colorado, have invented a new and useful Improvement in Cyanid and Chlorination Processes for Treating Gold or Silver Bearing Ores and in Apparatus for Use Therein, which improvements are fully set forth in the following specification.

This invention relates to an improvement in the cyanide process and chlorination process for treating gold and silver bearing ores, or to other analogous processes, in which leaching is a necessary feature and is more particularly an improved method of the preparation of the ores for these processes.

For the best treatment of the ores by leaching with cyanide of potassium or for chlorination it is essential, that the ores be presented in the leaching tanks in the form of granular products free from dust or slime. Ores containing coarse gold are unsuitable for direct treatment under these processes, and they are sometimes prepared by the ordinary process of stamping and amalgamation, and the stamped ore resulting leached or chlorinated. Serious objections arise to this method, for on many ores the stamps produce an amount of extremely fine material which I shall call slime if formed in wet crushing. The subsequent leaching of this slime is a difficult and tedious, if not impossible operation. In the case of ores that do not contain coarse gold, the preparation for treatment by chlorination or by the cyanide process is accomplished by either stamping dry or dry crushing in rolls or pulverizers to a fineness of thirty to fifty mesh. This also produces much fine material or powder, which in the case of the dry crushing I call dust. Like the slime, it very often makes a product that is difficult or impossible to leach.

The object of this invention is to prepare the ores by producing a granular product, with the minimum quantity of slime or dust, separating the granulated ore from the slime and dust and subjecting the latter to a separate treatment, which brings forth a porous product capable of being thoroughly and effectively leached with the minimum expenditure of time and money. By this process, which will be set forth and described more particularly hereinafter, soft and clayey ores are rendered amenable to the cyanide and chlorination processes though at present such ores cannot be treated by these processes as it is found impossible to leach them. Furthermore, many if not most ores are acid, and it is well known that acid will decompose cyanide of potassium and cause a large consumption of this expensive chemical. To neutralize such ores and so lower the consumption of cyanide, it has very often been found desirable to use an alkaline wash in the leaching tanks or mix lime with the ores in the crushing machines. To obtain the best results the ores should contain neither an excess of acid, or of alkali, but should be neutral, as an excess of alkali in the solution or precipitation tanks not only increases the consumption of the cyanide of potassium, but also of the zinc used to precipitate the gold and silver from solution.

One of the objects of this invention is to effectively neutralize the acidity of the ore and reduce the consumption of the cyanide of potassium and zinc to as low a point as can be done, by the application of alkaline solution in a new and more efficacious way, for by applying alkaline wash in the leaching tanks or incorporating lime with the ore, as has been usually done, considerable time is occupied and the leaching process is very often seriously interfered with.

Having now set forth the objects of this invention I shall describe more in detail the improved method by which they are accomplished, referring in aid of such description to the drawings which accompany this specification, in which—

Figure 1 is a vertical section of a pointed or V-shaped box for drawing off the granulated ore from the slime and solution. Fig. 2 is a vertical section on line II—II Fig. 3, and Fig. 3 is a horizontal section on line III—III of Fig. 2 representing a dust extractor hereinafter described.

The nature of my improved process is first, reducing the ore to the desired fineness by successive comminution in a series of rock breakers, usually three in number (the last two being of the multiple jaw pattern); screening the crushed ore produced by each breaker so as to remove that portion already reduced to the desired fineness, and finally treating the coarse product of the last rock breaker in granulators or improved pulverizers in successive steps until the ore is reduced to the desired fineness. I usually crush wet and by the means of successive comminution and wet crushing, I produce a granular product that can be cheaply and readily leached and containing the smallest quantity of slime. If the ores contain any acids and are to be leached with cyanide, I use an alkaline solution in which the ores are crushed. Any alkali can be used, but lime may on the whole, be found preferable, and can be added in the form of burnt lime to the ore in the crushing machines. When the ore contains any coarse gold in a form that can be amalgamated, I pass the crushed ore and alkaline solution over amalgamated copper plates and mercury riffles in the usual manner, to extract this gold.

From the amalgamated plates, &c., the ore and solution are passed through one or more pointed or V-boxes. Shown in Fig. 1. These boxes comprise two chambers B and C converging at their lower ends, where they join a vertical passage D, which connects with a pipe F. Either of the chambers, as B, is designed to receive the ore and solution while the other chamber serves as an outlet for the slime. The crushed ore and solution enter at 1 and a supply of water under pressure enters at 3. The granulated ore freed from the slime is drawn off at 4 into the leaching tanks or onto the draining floor. The slimes, if any are produced and the solution are discharged at 2 and the former are settled in large boxes or tanks, and are drawn off from time to time to be treated separately. The solution which usually contains some fine unsettled ore, is pumped back to be used over again.

In preference to adding the burnt lime to the ore in the crushing machines, I introduce the lime in the boxes or tanks used for settling the slime, in such quantities as may render the circulating solution sufficiently alkaline. By this means I can completely, or very nearly neutralize the ore, and at the same time avoid the passing of alkaline solutions into the precipitating boxes, thereby remedying the objection already stated.

The slime which settles out of the solution in the slime tanks and boxes as pointed out above, is principally clayey matter after it has been drawn off from the settling tank. This slime or clayey matter is mixed, when necessary with so much crushed limestone or lime, as may be required to prevent the formation of acids or acid salts during the subsequent kiln roasting, the object being to produce a roasted product, that will not decompose the cyanide solution. In roasting slime containing sulphites, acid sulphates might be formed which would cause a large consumption of cyanide in the subsequent leaching process. By adding lime, a sulphide of lime would be formed which would have no detrimental action on the cyanide. This mixture is then formed into briquets with or without the addition of further clay and the briquets burned in kilns or roasted in furnaces. A porous material is obtained which may be leached whole, if necessary, but is preferably crushed to pass a four mesh screen and leached with cyanide in the ordinary manner.

When the ores to be treated do not contain gold that will amalgamate in appreciable quantity, or if for other reasons, dry crushing may be found desirable in the treatment of ores by the cyanide or chlorination process, I crush by successive comminution as hereinbefore described and separate out the extremely fine dust from the granulated ore by the device shown in Figs. 2 and 3, which I call a dust extractor, wherein the exhaust from a fan draws out the fine dust from a thin stream of falling freely ore. The crushed ore enters at $a$ and is distributed over the central cone ($b$) falling in a thin shower from the base of the cone at $c\,c$. An adjustable pipe $d$ connected with an air exhaust fan $f$ draws out the dust from the thin stream of ore falling from the base of the cone and discharges it in a dust collector or ore bin $g$. The amount of dust removed from the ore may be regulated by the speed of the fan or by raising or lowering the pipe $d$ in the cone as shown by the dotted lines. The ore freed from the desired amount of dust is discharged from the pipe $g$. I do not confine myself to this apparatus for extracting dust from the granulated ore, as it may be effected by screens. The dust settled in the dust-collectors is made into briquets in the manner set forth.

I do not confine myself strictly to the size, shape or form of the briquets, as some ore, when mixed with water, can when dried, be burned or roasted in rough, unformed lumps, which form a granular and easily leached product, while on some few ores, a simple calcination of the dry dust will render it sufficiently porous for leaching.

I do not broadly claim the use of an alkaline solution or of amalgamation, but I do claim their application in a new way and as steps in my new process herein described.

It will be understood that the apparatus referred to in the foregoing explanation and not illustrated in the drawings are such as are well known and in common use.

What I claim is—

1. The herein described process of treating gold and silver bearing ores for extraction of the precious metals, said process consisting in reducing the ore to a granular state, separating from the granular mass the slime or dust, forming the latter into lumps or pieces as specified and roasting the same to a porous condition, and finally leaching the entire product, as set forth.

2. In the process of preparing gold and silver bearing ores for extracting the precious metals, the method of amalgamation consisting in obtaining by successive comminution of the ore in an alkaline solution a granular product and then subjecting said granulated ores and solution together to amalgamation, substantially as described.

3. A dust collector for ores, consisting of an exterior casing and interior cone, between which ore may fall in a thin layer, a feed pipe above said cone, and an adjustable discharge pipe below for the dust, substantially as described.

4. In the process of preparing gold and silver bearing ores for the extraction of the precious metals, the improvement consisting in separating the slime from the granulated ore, preventing the forming of acid in the slime by mixing lime therewith and then forming the mixture into lumps for burning, substantially as described.

5. In the treatment of gold and silver bearing ores, the improvement consisting in reducing the ore to a granulated condition, separating the slime or dust therefrom, roasting the latter in a furnace to obtain a porous product, and finally subjecting both to the action of a leaching solution, substantially as described.

In testimony whereof I have signed this specification in the presence of two subscribing witnesses.

PHILIP ARGALL.

Witnesses:
HENRY A. VEZIN,
R. B. McCONNEY.